United States Patent
Vogel et al.

(10) Patent No.: US 9,821,786 B2
(45) Date of Patent: Nov. 21, 2017

(54) DRIVE ASSEMBLY

(71) Applicant: Continental Teves AG & Co. oHG, Frankfurt (DE)

(72) Inventors: Günther Vogel, Dreieich (DE); Renè Lenz, Frankfurt am Main (DE); Axel Hinz, Neu-Anspach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 203 days.

(21) Appl. No.: 14/758,310

(22) PCT Filed: Jan. 14, 2014

(86) PCT No.: PCT/EP2014/050518
§ 371 (c)(1),
(2) Date: Jun. 29, 2015

(87) PCT Pub. No.: WO2014/111352
PCT Pub. Date: Jul. 24, 2014

(65) Prior Publication Data
US 2015/0336554 A1  Nov. 26, 2015

(30) Foreign Application Priority Data

Jan. 16, 2013  (DE) ........................ 10 2013 200 545

(51) Int. Cl.
*B60T 13/74* (2006.01)
*B60T 8/36* (2006.01)
(Continued)

(52) U.S. Cl.
CPC ............ *B60T 13/745* (2013.01); *B60T 8/368* (2013.01); *F04B 17/03* (2013.01); *H02K 5/1672* (2013.01); *H02K 7/075* (2013.01)

(58) Field of Classification Search
CPC ......... B60T 8/368; B60T 13/745; F04B 17/03
(Continued)

(56) References Cited

U.S. PATENT DOCUMENTS 6,179,580 B1    1/2001  Huber
6,481,981 B1   11/2002  Burgdorf
(Continued)

FOREIGN PATENT DOCUMENTS

CN       101888142      11/2010
DE        19642133       4/1998
(Continued)

OTHER PUBLICATIONS

International Search Report for International Application No. PCT/EP2014/050518 dated Jun. 23, 2014.
(Continued)

*Primary Examiner* — Ramon M Barrera
(74) *Attorney, Agent, or Firm* — RatnerPrestia

(57) ABSTRACT

A drive assembly having a motor accommodating bore for an electric motor, the bore being directed perpendicularly into an end face of a block-like accommodating body, and having a motor housing for accommodating a bearing provided for a motor shaft of the electric motor the bearing being fixed in an end-side motor housing section which extends into the motor accommodating bore. The invention provides for the electric motor to be frictionally fixed and centered in the motor accommodating bore by a motor holder that is fastened to the end-side motor housing section and projects into the motor accommodating bore.

16 Claims, 2 Drawing Sheets

(51) Int. Cl.
    *F04B 17/03*     (2006.01)
    *H02K 5/167*     (2006.01)
    *H02K 7/075*     (2006.01)

(58) Field of Classification Search
    USPC .......................................... 417/360; 310/91
    See application file for complete search history.

(56) References Cited

U.S. PATENT DOCUMENTS

| | | | |
|---|---|---|---|
| 8,272,853 B2 * | 9/2012 | Ko | F04D 17/04 |
| | | | 415/53.1 |
| 2010/0290933 A1 | 11/2010 | Tabata | |

FOREIGN PATENT DOCUMENTS

| | | |
|---|---|---|
| DE | 19706124 | 8/1998 |
| DE | 102009048109 | 4/2011 |
| EP | 2253848 | 11/2010 |

OTHER PUBLICATIONS

Chinese Office Action dated Jun. 3, 2016 for Chinese Application No. 201480004707.8, including English translation, 9 pages.

\* cited by examiner

DRIVE ASSEMBLY

CROSS REFERENCE TO RELATED APPLICATIONS

This application is the U.S. National Phase Application of PCT International Application No. PCT/EP2014/050518, filed Jan. 14, 2014, which claims priority to German Patent Application No. 10 2013 200 545.8, filed Jan. 16, 2013, the contents of such applications being incorporated by reference herein.

FIELD OF THE INVENTION

The invention relates to a drive assembly, in particular for a slip-controlled brake system.

BACKGROUND OF THE INVENTION

A drive assembly of the abovementioned type is already known from DE 10 2009 048 109 A1 incorporated by reference herein. The drive assembly comprises a block-shaped mounting body, having a motor location hole for an electric motor, said hole being directed perpendicularly into an end face of the block-shaped mounting body, and having a motor housing for accommodating a bearing provided for a motor shaft of the electric motor, said bearing being fixed in an end-side motor housing section which extends as far as the motor accommodating hole. To secure the electric motor on the mounting body, the motor housing is provided with three tabs, which are secured on the mounting body by means of three holding screws while resting on the end of the mounting body. Owing to a large number of production steps which are required, this construction represents a relatively large expense and furthermore also does not allow a reduction in the protrusion of the motor housing on the mounting body

SUMMARY OF THE INVENTION

It is therefore an aim of an aspect the invention to develop a drive assembly of the type indicated in such a way that the abovementioned disadvantages are avoided.

BRIEF DESCRIPTION OF THE DRAWINGS

Further features and advantages of the invention are explained below by means of the description of two illustrative embodiments with reference to drawings.

DETAILED DESCRIPTION OF THE PREFERRED EMBODIMENTS

Figure 1:
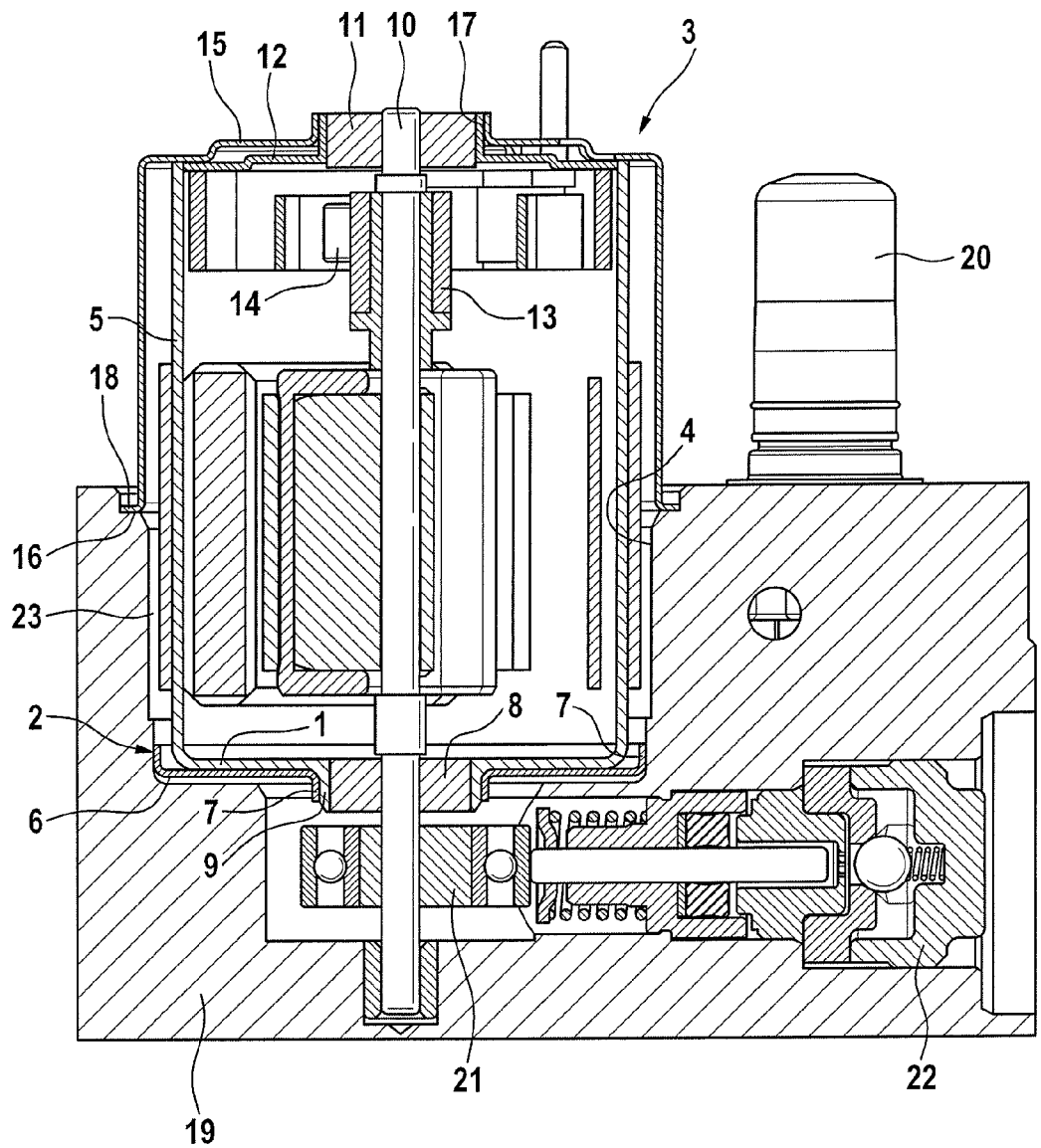
FIG. 1 illustrates a drive assembly for a slip-controlled brake system according to a first embodiment.

FIG. 1 shows a drive assembly used for slip-controlled motorcycle brake systems in longitudinal section, having a block-shaped mounting body 19, into the end surface of which a motor location hole 4 for an electric motor 3 opens at right angles. The figure furthermore shows a motor housing 5 belonging to the electric motor 3, said housing having a substantially hollow-cylindrical contour and accommodating a bearing 8 provided for a motor shaft 10 of the electric motor 3 in an end-side motor housing section 1. Up to about half the length of the motor housing 5 is recessed into the motor location hole 4, with the result that it protrudes by only a small amount above the end surface of the mounting body 19, wherein the protrusion corresponds to the protrusion of a valve dome 20, which is arranged next to the motor housing 5 and is part of an electromagnetically actuable pressure modulation valve. This equal-height arrangement has the advantage that, after a solenoid has been placed on the valve dome 20, it is a particularly simple matter to bring the electrical contacts of the solenoid and the electrical contacts of the electric motor 3 directly into engagement with a circuit board, arranged horizontally above the electric motor 3 and the solenoid, of an electronic control unit, resulting in a compact overall construction since the control unit (not shown), as part of a covering cap, surrounds the upper side of the mounting body 19 in a fluidtight manner. As is readily apparent from the figure, the end-side motor housing section 1 extends by means of the adjoining circumferential surface of the motor housing 5 into the motor location hole 4 with a radial clearance, wherein a motor holder 2, which is completely recessed into the motor location hole 4, is advantageously secured on the end-side motor housing section 1, the fixing and centering of the electric motor 3 within the motor location hole 4 thus being ensured by the motor holder 2.

As a holding plate, the motor holder 2 is embodied in a particularly simple manner, wherein the holding plate has at its outer circumference a radial overlap 6 relative to the outside diameter of the motor housing 5, said overlap being in engagement with the inner wall of the motor location hole 4 by means of a press fit, as shown in the figure. In a front view (not shown), the motor holder 2 is revealed to be an annular disk, which, as shown in the figure, has a collar 7 provided with a press fit both on its radial overlap 6, for fixing in the motor location hole 4, and on its inner circumference, for fixing on the end-side motor housing section 1. The motor holder 2 in the form of an annular disk can be produced at particularly low cost by punching and deep drawing a thin sheet by means of a small number of processing steps.

In the illustrative embodiment under consideration, the collar 7 provided on the inner circumference of the motor holder 2 in the form of an annular disk is thus fixed by frictional engagement directly on a projection 9, which surrounds the bearing 8 and forms part of the end-side motor housing section 1. If desired or required, it is likewise possible for the collar 7 directly to surround the bearing 8 if the projection 9 is dispensed with or if the bearing 8 projects by a sufficient amount from the end-side motor housing section 1.

As is furthermore apparent from FIG. 1, a further end-side motor housing section 12, which accommodates the motor shaft 10 in a further bearing 11, is provided on the opposite end of the electric motor 3 from motor housing section 1. The further end-side motor housing section 12 is furthermore designed as a brush carrier plate to accommodate a plurality of brushes 14 in brush holders, with the result that the motor housing section 12 projecting from the motor location hole 4 forms a multifunctional unit. Adjoining the further bearing 11, the motor shaft 10 carries a commutator 13 at a short axial distance from the bearing 11, on which commutator the brushes 14 of the brush carrier plate rest under a spring pressure.

A fixing cap 15, which is in engagement with the further motor housing section 12 and extends into the motor location hole 4 as far as the axial contact with a housing step 16, is placed over the further end-side motor housing section 12, which forms a unit with the tubular section of the motor housing 5. The fixing cap 15 has an opening 17 in the region of the further end-side motor housing section 12, in which opening the further bearing 11 is held with the end-side motor housing section 12 surrounding the further bearing 11.

In the contact region of the housing step 16, the fixing cap 15, which surrounds at least half of the motor housing 5 in a bell shape, has a rim 18, which is directed radially outward and is fixed positively and also nonpositively in the motor location hole 4 by means of plastic displacement, in the direction of the housing step 16, of the material of the mounting body 19 adjoining the motor location hole 4.

By means of the fixing cap 15 and of the holding plate 2, reliable fastening of the electric motor 3 in the motor location hole 4 is thus ensured in order to actuate the pump piston of a radial piston pump 22, said pump piston being guided transversely to the motor shaft 10 in a pump bore, by means of an eccentric 21 secured on the lower end of the motor shaft 10 in the illustrative embodiment under consideration. In this case, the holding plate 2, which is adjacent to the eccentric, centers the electric motor 3 in the lower part of the motor location hole 4 and supports some of the motor torque, while the fixing cap 15, which is introduced into the motor location hole 4 until it abuts the housing step 16 and locked, is used not only to absorb the remainder of the motor torque but also to define the desired installation depth of the electric motor 3, for which purpose a sufficient axial clearance is provided between the holding plate 2 and the bottom of the motor location hole 4 to compensate installation tolerances.

To facilitate assembly, the motor location hole 4 has a hole section 23 which, as compared with the press-fit region, situated in the lower end section of the motor location hole 4 of the holding plate 2, is widened slightly relative to the outside diameter of the holding plate 2 between its housing step 16 and said press-fit region in order to avoid having to press the electric motor 3 into the mounting body 19 with a large expenditure of force over the entire depth of the motor location hole 4.

Figure 2:
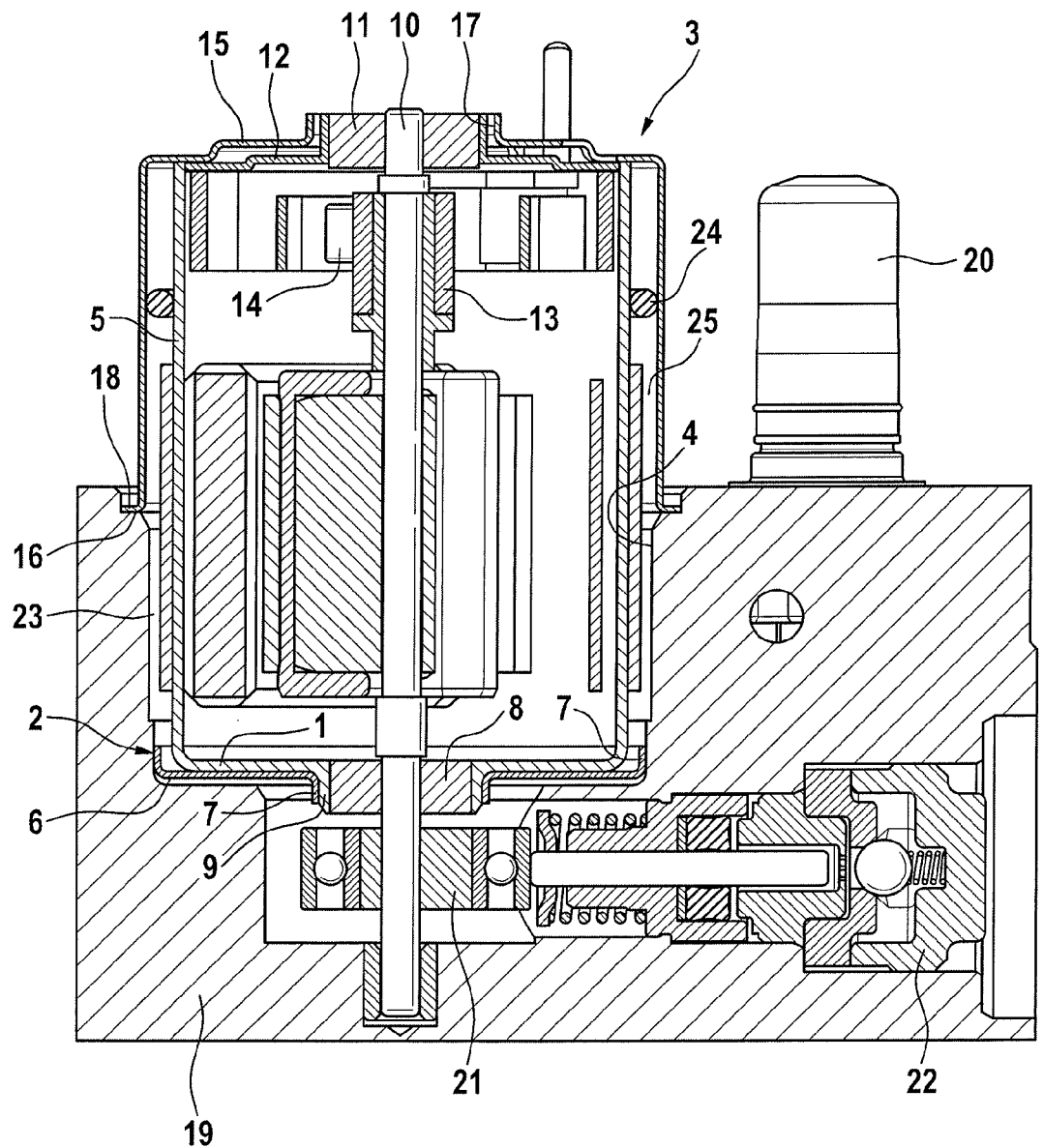
FIG. 2 illustrates a drive assembly for slip-controlled brake system according to a second embodiment.

The drive assembly depicted in FIG. 2 differs from the drive assembly shown in FIG. 1 in that the motor housing section 12 is accommodated with a radial clearance within the opening 17 provided in the fixing cap 15, with the result that there is advantageously no transmission of force to the motor housing section 12 while the fixing cap 15 is being placed on. Deformation of the motor housing during the mounting of the fixing cap 15 is thereby excluded. An interspace 25 is provided between the inner wall of the fixing cap 15 and the outer wall of the further motor housing section 12, said interspace extending along the motor housing 5 into the hole section 23 of the mounting body 19. According to FIG. 2, an elastically deformable ring element 24, in which the motor housing 5 is mounted in a more or less elastic way in the fixing cap 15, is clamped into the interspace 25. Elastic support for the motor housing 4 in the fixing cap 15 with vibration- and hence noise-absorbing properties is thus obtained at a location remote from the fixing of the electric motor 3 in the motor holder 2.

All further details which are apparent from FIG. 2 but have not hitherto been described explicitly with reference to FIG. 2 can be found in the description of the drive assembly depicted in FIG. 1.

LIST OF REFERENCE SIGNS 1 motor housing section
2 motor holder
3 electric motor
4 motor location hole
5 motor housing
6 overlap
7 collar
8 bearing
9 projection
10 motor shaft
11 bearing
12 motor housing section
13 commutator
14 brush
15 fixing cap
19 housing step
17 opening
18 rim
19 mounting body
20 valve dome
21 eccentric
22 radial piston pump
23 hole section
24 ring element
25 interspace

The invention claimed is:

1. A drive assembly, for a slip-controlled brake system, comprising:
   a motor location hole for an electric motor, said hole being directed perpendicularly into an end face of a block-shaped mounting body,
   a motor housing for accommodating a bearing provided for a motor shaft of the electric motor, said bearing being fixed in an end-side motor housing section which extends as far as the motor location hole,
   wherein a motor holder is secured on the end-side motor housing section, said motor holder being recessed into the motor location hole, such that the motor holder fixes the electric motor within the motor location hole,
   wherein the motor holder is a holding plate having a radial overlap at an outer circumference of the holding plate relative to an outside diameter of the motor housing, the overlap engaging with an inner wall of the motor location hole by a press fit.

2. The drive assembly as claimed in claim 1, wherein a further end-side motor housing section, which accommodates the motor shaft in a further bearing, is provided on the opposite end of the electric motor from the motor housing section.

3. The drive assembly as claimed in claim 2, wherein adjoining the further bearing, the motor shaft carries a commutator, which interacts with a plurality of brushes of a brush carrier plate.

4. The drive assembly as claimed in claim 2, wherein a fixing cap, which extends into the motor location hole as far as an axial contact with a housing step, is placed over the further end-side motor housing section.

5. The drive assembly as claimed in claim 4, wherein the fixing cap has an opening in a region of the further end-side motor housing section, into which opening the further bearing projects with the further end-side motor housing section surrounding the further bearing.

6. The drive assembly as claimed in claim 5, wherein the motor housing section has a radial clearance within the opening provided in the fixing cap, wherein there is no transmission of force to the motor housing section while the fixing cap is being placed on.

7. The drive assembly as claimed in claim 4, wherein an interspace is provided between an inner wall of the fixing cap and an outer wall of the further motor housing section.

8. The drive assembly as claimed in claim 7, wherein the interspace extends along the motor housing into a hole section of a mounting body.

9. The drive assembly as claimed in claim 7, wherein an elastically deformable ring element, in which the motor housing is mounted, is clamped into the interspace.

10. The drive assembly as claimed in claim 5, wherein at least one of the further bearing and the further end-side motor housing section is accommodated without a clearance in the opening of the fixing cap.

11. The drive assembly as claimed in claim 4, wherein the fixing cap has, in the contact region of the housing step, a rim, which is directed radially outward and is fixed positively and also nonpositively in the motor location hole by plastic displacement, in the direction of the housing step, of the material of the mounting body adjoining the motor location hole.

12. The drive assembly as claimed in claim 8, wherein an elastically deformable ring element, in which the motor housing is mounted, is clamped into the interspace.

13. A drive assembly for a slip-controlled brake system, comprising:
a motor location hole for an electric motor, said hole being directed perpendicularly into an end face of a block-shaped mounting body,
a motor housing for accommodating a bearing provided for a motor shaft of the electric motor, said bearing being fixed in an end-side motor housing section which extends as far as the motor location hole,
wherein a motor holder is secured on the end-side motor housing section, said motor holder being recessed into the motor location hole, such that the motor holder fixes the electric motor within the motor location hole, and
wherein the motor holder is an annular disk, which has a collar both on a radial overlap of the annular disk, for fixing in the motor location hole, and on an inner circumference of the annular disk, for fixing on the end-side motor housing section.

14. The drive assembly as claimed in claim 13, wherein the motor holder is produced by punching and deep drawing a thin sheet.

15. The drive assembly as claimed in claim 13, wherein the collar provided on the inner circumference of the motor holder in the form of an annular disk is fixed by frictional engagement directly on a projection that surrounds the bearing and forms part of the end-side motor housing section.

16. A drive assembly for a slip-controlled brake system, comprising:
a motor location hole for an electric motor, said hole being directed perpendicularly into an end face of a block-shaped mounting body,
a motor housing for accommodating a bearing provided for a motor shaft of the electric motor, said bearing being fixed in an end-side motor housing section which extends as far as the motor location hole,
wherein a motor holder is secured on the end-side motor housing section, said motor holder being recessed into the motor location hole, such that the motor holder fixes the electric motor within the motor location hole, wherein a further end-side motor housing section, which accommodates the motor shaft in a further bearing, is provided on the opposite end of the electric motor from the motor housing section, and
wherein the further end-side motor housing section is a brush carrier plate accommodating a plurality of brushes in brush holders.

* * * * *